United States Patent [19]

Allen et al.

[11] Patent Number: 5,396,923

[45] Date of Patent: Mar. 14, 1995

[54] SURGE RELIEF APPARATUS AND METHOD

[76] Inventors: Donald M. Allen, 494 W. I St., Benicia, Calif. 94510; Drew S. Weaver, 5618 Verdome La., Houston, Tex. 77092

[21] Appl. No.: 967,456

[22] Filed: Oct. 28, 1992

[51] Int. Cl.⁶ ............................................. F16K 31/124
[52] U.S. Cl. ................... 137/487.5; 137/492.5
[58] Field of Search ................ 137/14, 487.5, 492, 137/492.5

[56] References Cited

U.S. PATENT DOCUMENTS

| | | | |
|---|---|---|---|
| 3,007,492 | 11/1961 | Grimmer | 137/488 X |
| 3,775,622 | 11/1973 | Fredericks et al. | 137/487.5 X |
| 3,890,992 | 6/1975 | Wolz et al. | 137/487.5 X |
| 5,050,634 | 9/1991 | Fiechtner | 137/487.5 X |

*Primary Examiner*—Stephen M. Hepperle
*Attorney, Agent, or Firm*—Alton W. Payne

[57] ABSTRACT

A surge relief apparatus for sensing, tracking and responding to pressure changes in a flow system to prevent damage caused by transient pressure changes in the flow system having one or more conduits with fluid. The surge relief apparatus comprising a transient pressure sensor, a pressure sensor, a regular and a valve. The transient pressure sensor is in communication with an upstream conduit and is responsive only to the fluid in the flow system for sensing transient pressure changes and for generating a first signal continuously proportional to the rate of change of the pressure. The pressure level sensor is in communication with an upstream conduit and is responsive only to the fluid in the flow system for sensing pressure changes in the flow system and for generating a second signal continuously proportional to the pressure level in the system. The regulator is responsive only to the first and second signals from the sensors for producing a discharge signal when either the rate of the transient pressure change is greater than a predetermined value or the pressure level in the system exceeds a preestablished value, the discharge signal for continuously tracking the pressure differentiae in the flow system. The valve receives the discharge signal from the regulator and transfers bypass fluid from the flow system for relieving the surge of pressure indicated by the rate of the transient pressure change or the pressure level in the system.

2 Claims, 7 Drawing Sheets

SURGE RELIEF APPARATUS AND METHOD

FIELD OF THE INVENTION

The present invention relates generally to a surge relief apparatus and method. Specifically, the present invention relates to a surge relief apparatus and method for sensing and controlling surges for protecting piping systems from damage due to transients by controlling the rate of pressure change in a fluid system.

BACKGROUND OF THE INVENTION

In all fluid systems, there is a need to guard against damage associated with pressure surges. Typically, a pressure surge is generated when there is a change in the rate of flow of fluid in a closed conduit. The surge pressure can be dangerously high if the change in the rate of fluid flow in the conduit is too great. In many applications, such as pipelines and storage or loading-/unloading terminals, there is a need to protect equipment and personnel from the potential damages that such pressure surges create.

Pressure surges are sometimes called "water hammer." The surge of pressure can be generated by any pipeline component that causes the fluid velocity in the conduit to change. For example, surge pressures or water hammer can be created by closing an automatic emergency shut down (ESD) device, the closure or opening of a manual or power operated valve, slamming shut of a non-return valve, or starting or stopping a pump. To protect larger fluid systems from piping component failure, the pressure surge associated with the water hammer must be relieved. In piping systems, it is especially important that a surge relief system be adaptable for a quick response time, and adaptable with respect to high flow capacity.

Surge pressures may vary in magnitude from virtually undetectable to such severity as to cause major damage to equipment and possibly loss of life. Several examples of problems caused by insufficient surge protection in fluid systems include separation of flanges, pipe fatigue, weld failure or circumferential or longitudinal over stressing of the pipe, pumps knocked out of alignment, severe damage to piping and piping supports as well as damage to specialized components such as loading arms, hoses, filters and the like due to the hydraulic shock propagated through the fluid. It is important that during interruption of steady-state operation a potentially damaging transient, i.e., a water hammer, is detected, and automatically expunged by relieving a sufficient volume of fluid from the system, thereby attenuating the transient to within acceptable limits.

Typically, protection is provided by a fixed-set-point surge relief device. A fixed-set-point surge relief system provides that when the increase in pressure reaches a specific set pressure level, a valve or valves open to relieve the excess pressure and attenuate the transient.

Alternatively, a floating-set-point surge relief system provides that when the time rate of change of pressure exceeds a pre-determined value, a valve or valves open to relieve the excess pressure and control the pressure transient. An important feature of the floating-set-point system is that it provides protection from pressure surges even though the steady-state-fluid pressure level in the pipeline may change due to varying sets of operating conditions. In such situations, a surge relief system must respond rapidly yet operate very smoothly. Such a system should respond to the increasing pressure rise, i.e., the transient pressure rise, and timely open the pressure relief mechanism. Thereafter, the system should control the rate of pressure rise, the transient, to maintain the pressure within acceptable limits. The relieved flow can be dissipated in a large storage vessel and later returned to the product line.

It is, therefore, a feature of the present invention to provide a surge relief apparatus and method which is responsive to an increasing rate of pressure change.

It is a particular feature of the present invention to provide a surge relief apparatus and method which in normal use provides control of a transient surge while allowing for varying sets of operating conditions of fluid in a conduit.

It is a feature of the present invention to provide a surge relief apparatus and method which in normal use requires no separate power source.

Another feature of the present invention is to provide a surge relief apparatus and method which accommodates high flow capacity.

Another feature of the present invention is to provide a surge relief apparatus and method which in normal use has an extremely fast response time.

Yet another feature of the present invention is to provide a surge relief apparatus and method which in normal use provides the rapid opening of a line responsive to the transient effect and the controlled closing of the line.

Another feature of the invention is the detection and control of only increasing pressure surges, thereby eliminating inadvertent opening of the surge relief system during a decreasing transient.

Yet another feature of the present invention is to provide a means for simulated testing of the surge relief system, for purposes of testing the system response to a condition which would emulate the effect of a pipeline transient.

Still another feature of the present invention is to provide a surge relief apparatus and method which is suited for use with varying types of pipeline fluids.

Another feature of the present invention is to provide a surge relief apparatus and method wherein the rate of pressure change on which the system operates can be adjusted.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, a surge relief apparatus and method are provided for sensing, tracking and responding to pressure changes in a flow system to prevent damage caused by transient pressure changes in the flow system having one or more conduits with fluid. The surge relief apparatus comprising a transient pressure sensor connected to an upstream conduit and responsive only to the fluid in the flow system for sensing transient pressure changes and for generating a first signal continuously proportional to the rate of change of the pressure, a pressure level sensor connected to an upstream conduit and responsive only to the fluid in the flow system for sensing pressure level changes in the flow system and for generating a second signal continuously proportional to the pressure level in the system, a regulator responsive only to the first and second signals from the sensors for producing a discharge signal when either the rate of the transient pressure change is greater than a predetermined value or the pressure level in the system exceeds a preestablished value. The discharge signal continuously tracks the pressure differentiae in the flow system. A valve for receiving the discharge signal from the regulator for transferring by-pass fluid from the flow system for relieving the surge of pressure indicated by the rate of the transient pressure change or the pressure level in the system.

In another embodiment, a surge relief apparatus for preventing damage due to transient pressure differentials in flow systems having conduits through which fluid flows and uses a measuring element for sensing transient pressure changes. The measuring element comprising a pressure sensor for detecting a change in pressure, a stabilizing member having a linear response with respect to pressure such that a gradual pressure increase is ineffective to activate the measuring element and a transient pressure increase is effective to activate the measuring element, a regulator in operative association with the measuring element, and means for by-passing the surging fluid from the flow system in response to the regulator.

In yet another embodiment, a method of directly and continuously sensing, tracking and responding to pressure changes in a flow system to prevent damage caused by transient or pressure level changes in the flow system having one or more conduits with fluid. The method comprising the steps of sensing the transient pressure changes from an upstream conduit in the flow system indicative of the rate of change of the pressure, generating a first signal continuously proportional to the rate of change of the pressure, sensing pressure level changes from an upstream conduit in the flow system indicative of the pressure level in the system, generating a second signal continuously proportional to the pressure level in the system, producing a discharge signal when either the rate of the transient pressure change is greater than a predetermined value or the pressure level in the system exceeds a preestablished value, and transferring by-pass fluid from the flow system based upon the discharge signal for relieving the surge of pressure indicated by the rate of the transient pressure change or the pressure level in the system.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Figure 1:
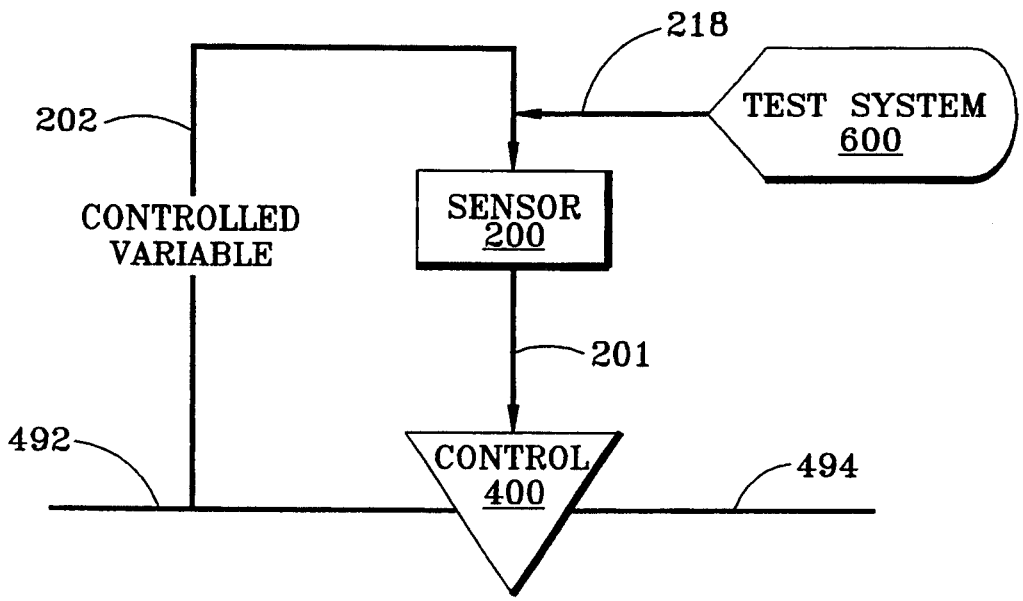
FIG. 1 is a flow diagram of an embodiment of the surge relief apparatus encompassed by the present invention.

FIG. 1 is a flow diagram of an embodiment of the surge relief apparatus encompassed by the present invention. FIG. 1 illustrates a sensor 200 and a control 400 as being the primary elements of the invention. A test system 600 is used to calibrate and test the surge relief apparatus of the present invention. The pressure in the line 492 is sensed by a line 202. The line 202 is accepted by the sensor 200. The sensor 200 is preset to a specific rate of pressure increase. As the controlled variable pressure in the line 202 changes, the sensor 200 provides a signal through a line 201 to the control 400. The control 400 provides that flow is diverted to line 494 according to the requirements of the system to control the rate of pressure increase.

Figure 2:
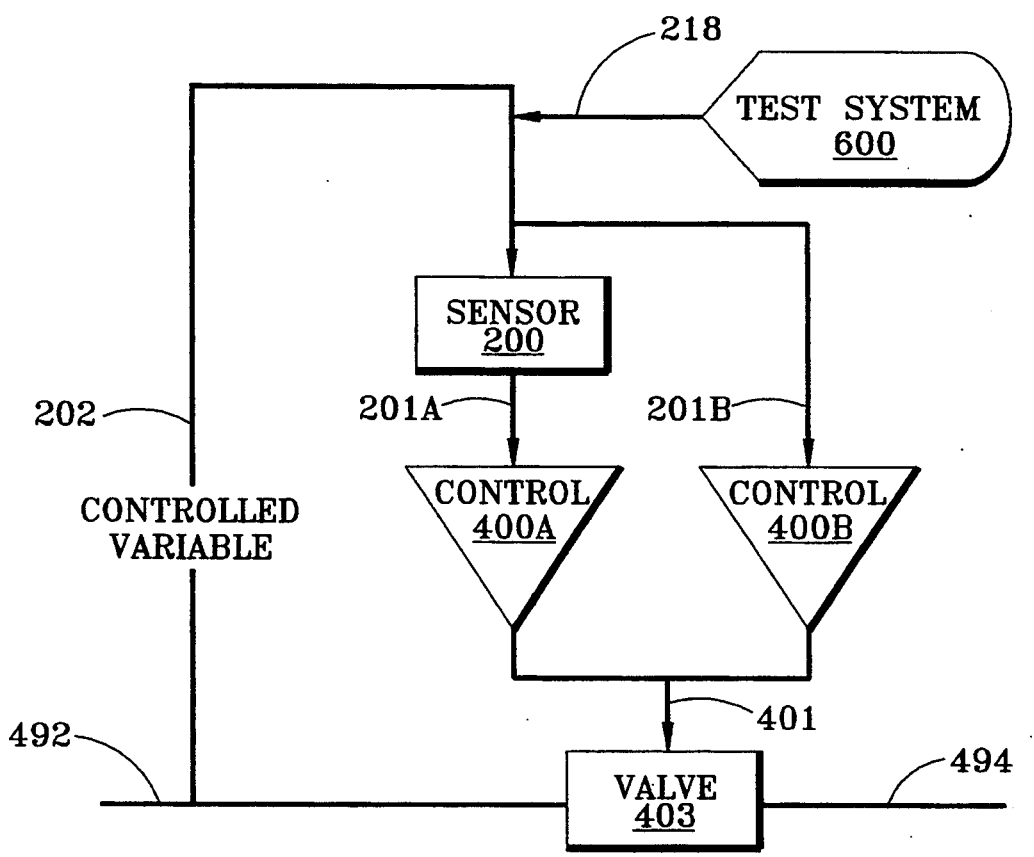
FIG. 2 is a flow diagram of another embodiment of the surge relief apparatus encompassed by the present invention.

FIG. 2 is a flow diagram of another embodiment of the surge relief apparatus of the present invention. The primary components of the surge relief apparatus illustrated in FIG. 2 are a sensor 200, a control 400A, a control 400B and a valve 403. The pressure in a line 492 is transferred to the sensor 200 via a line 202. Also, the pressure in the upstream line 492 is transferred directly to the control 400B via the line 201B. The sensor 200 provides a signal to the control 400A which is responsive to the rate of increase of the pressure in the upstream line 492. A signal from the sensor 200 is provided to the control 400A via the line 20 1A. The controls 400A, 400B provide a signal to the valve 403 via the line 401. When the rate of rise increases above a predetermined value, the valve 403 is actuated and the rate of pressure increase is controlled by relieving fluid from the system via a downstream line 494. Similarly, when the pressure level in the upstream line 492 exceeds a set value, the control 400B activates the valve 403 to relief pressure through the downstream line 494. Thus, FIG.

2 illustrates a dual control system for relieving pressures exceeding a fixed maximum pressure, and for controlling the rate of pressure increase.

Figure 3:
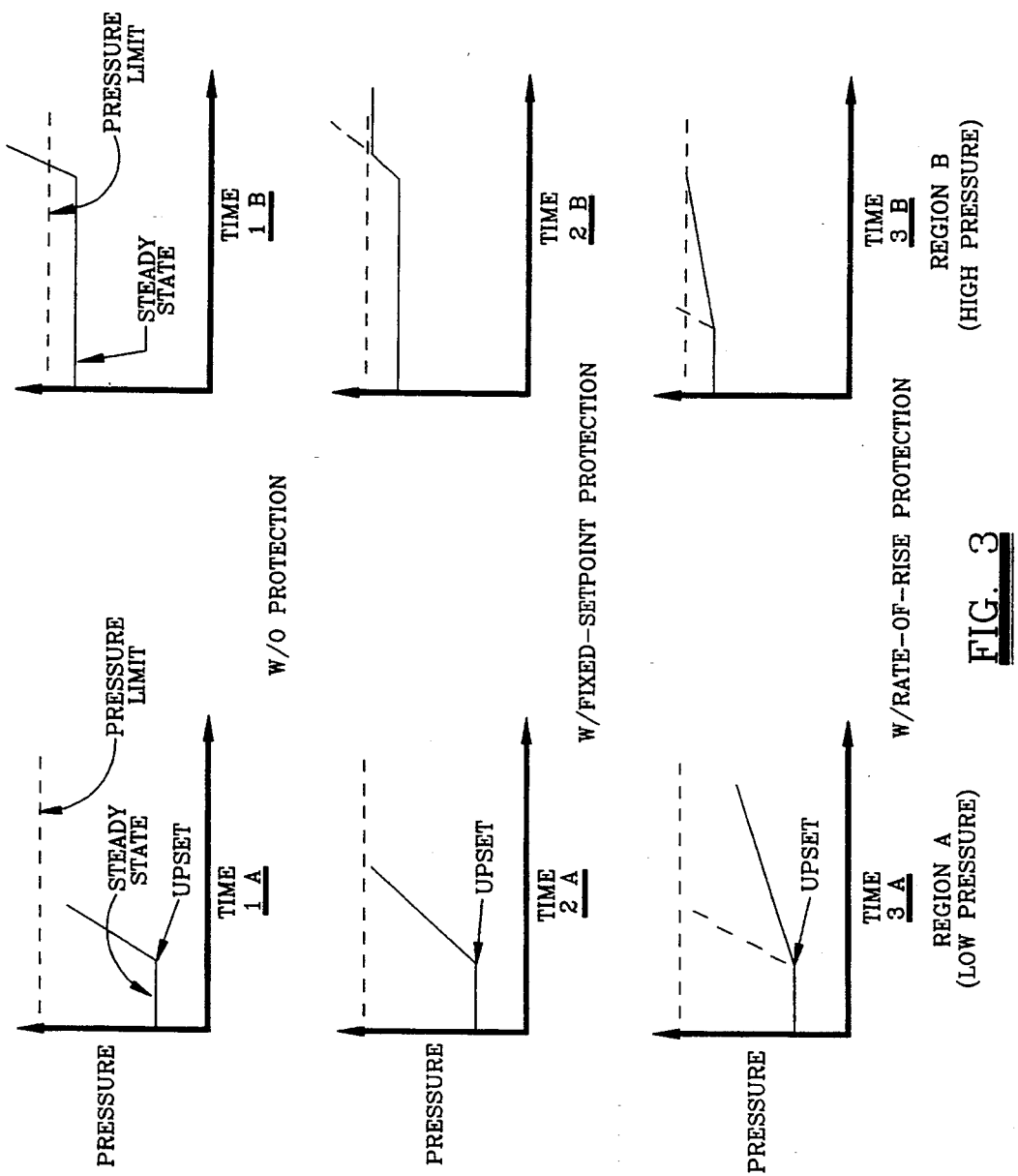
FIG. 3 is a graph of pressure versus time for conditions encountered on a pipeline or piping system in which the present invention is be utilized.

FIG. 3 illustrates two pipeline operating regions, i.e., two different locations on the pipeline: Region A which is low pressure operation and Region B which is high pressure operation. Referring to case 1A, the steady-state pressure is affected by an upset condition which causes the pressure to rise rapidly. This pressure increase is propagated along the pipeline and causes a similar rapid increase in pressure to occur at Region B (case 1B), where due to the high pressure operating condition, the pipeline pressure limit is exceeded. Case 2A illustrates the same upset condition as in case 1A. With fixed set point surge protection added at Region B, case 2B illustrates the pressure being relieved at the pressure limit. Case 3A illustrates the same upset condition, but with rate of rise relief protection located at Region A, the source of the upset condition, which controls the rate of pressure change. This controlled lower rate of pressure rise is now propagated along the pipeline, and is shown at Region 3B to not exceed the pressure limit.

One problem with fixed-set-point surge protection is that there may occur pipeline operation modes in which the normal steady-state operating pressure is not always the same. For instance, at one operating mode, the steady state pressure may be 400 PSIG, while at another operating mode, the steady state pressure may be 600 PSIG. Therefore, the surge relief valves can only normally be set to operate at the maximum allowable operating pressure (MAOP) of the pipeline and are limited in application to the high pressure operating regions of the pipeline. Thus in the typical situation, fixed-set-point surge protection will only respond if the maximum allowable operating pressure has been exceeded. As the present invention can float with the pipeline pressure at any steady-state condition, the unit can be located at or near the source of surge generation to control the rate of pressure change so that excessive rates of pressure change will not propagate along the pipeline, which allows time for various pipeline systems to respond and maintain pipeline operations within acceptable pressure limits. It can be appreciated by one skilled in the art that the present invention is adaptable for use over any pressure range.

Figure 4:
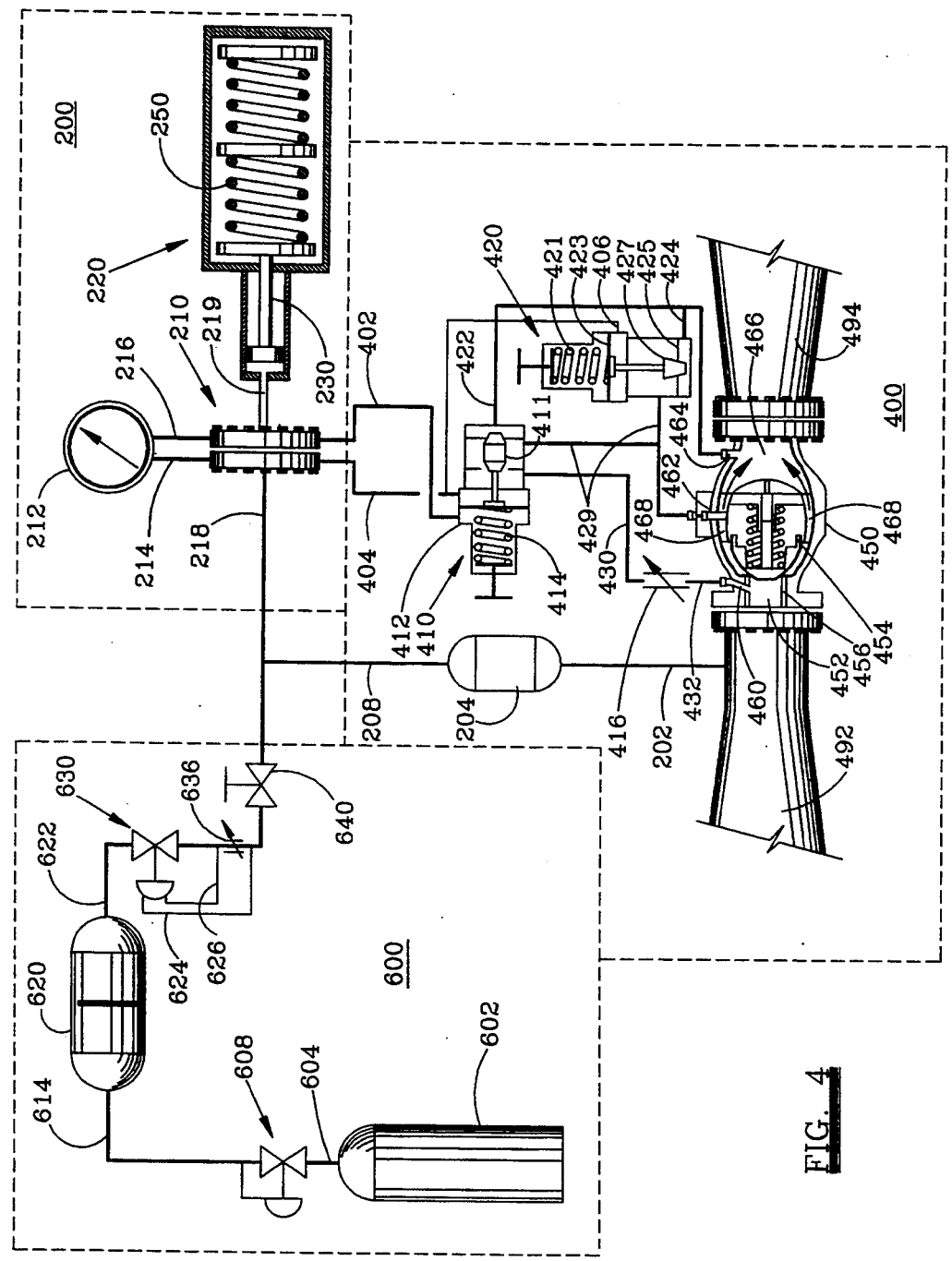
FIG. 4 is a preferred embodiment of the surge relief apparatus encompassed by the present invention.

FIG. 4 illustrates the surge relief system 100, including a sensor 200, a control unit 400 and a testing system 600. The sensor 200 and the control unit 400 are the primary components of the surge relief system 100. The fluid enters and fills a conduit 492, upstream of a normally closed valve 450. Opening the valve 450 causes the fluid to exit an outlet conduit 494. Normally fluid would enter and fill the conduit 492, pass through a line 432, through an adjustable speed controller 416, through a line 430 and into a differential pilot regulator 410. Thereafter, fluid would fill one or more lines 429 to be received by the valve 450 thereby holding the valve 450 in the closed position with respect to by-pass flow. Also, the fluid pressure would engage an upstream line 202 prior to engaging a measuring element 210. The measuring element 210 can be, for example, an orifice meter. The measuring element 210 is connected to a differential pressure gauge 212 by a first line 214 and a second line 216. A change in the pressure in the line 202 upstream of the measuring element 210 causes a pressure differential which relates to the flow rate between the line 218 on the upstream side, and a line 219, on the downstream side of the measuring element 210. The downstream line 219 associated with the measuring element 210 is operationally associated with a reference element 220. The reference element 220 is a linearizing device. Under steady-state conditions, the pressure level applied to the reference element 220 is closely related to the pressure level in the line 492. In one embodiment, the reference element 220 has a fluid chamber 230 and a spring chamber 250. The pressure on the upstream side of the measuring element 210 is transferred via an upstream line 402 to the differential pilot regulator 410. The downstream pressure is transferred via a line 404 to the differential pilot regulator 410. Another line 406 connects the upstream line 402 to a back pressure pilot regulator 420. The back pressure pilot regulator 420 is operationally associated with several lines 422, 424, 429 and 406. The flow from the differential pilot regulator 410 can pass through the first line 422 and the second line 424 into the downstream port 464 of the valve 450.

The valve 450 is typically know as the DANFLO ® valve. The valve 450 has an inlet port 452 and an outlet port 466. The inlet port 452 is associated with a plug 454 which is sealed in the inlet port 452 by a seal 456. Also associated with the inlet port 452 is an upstream port 460. The interior of the valve 450 receives flow through a plug cavity port 462. Also, flow can egress through the outlet port 466 by the downstream port 464. When the plug 454 is displaced, fluid passes from the inlet port 452 through the annular passage 268 and into the outlet port 466.

The testing system comprises a canister of compressed gas 602 from which the gas passes via a line 604. A pressure reducing regulator 608 controls the pressure downstream of the regulator 608. A line 614 passes the gas from the pressure reducing regulator 608 to the accumulator 620. The flow from the accumulator 620 is controlled by a differential pressure regulator 630 in conjunction with a metering valve 636. The test system provides a variable rate of pressure change to the sensor 200 via the valve 640 and the line 218.

With respect to the differential pilot regulator 410, a double acting valve 411 is illustrated. The flow coming into the double acting valve 411 via the line 430 is modulated by the signal from the measuring element 210 and the reference element 220. The back pressure pilot 420 has a spring 421, a diaphragm 423, a poppet 427 and a seat 425 associated with the poppet. Obviously, other embodiments of the present invention are readily available to those skilled in the art. The present preferred embodiment is provided as an illustration of one of the embodiments of the present invention.

The separation device 204 is used to separate or seal the secondary fluid from a primary fluid. Separation device 204 can be placed at various locations to provide a separation of different fluids in the system. One of skill will appreciate the various locations and arrangements of such separation device 204.

Figure 5:
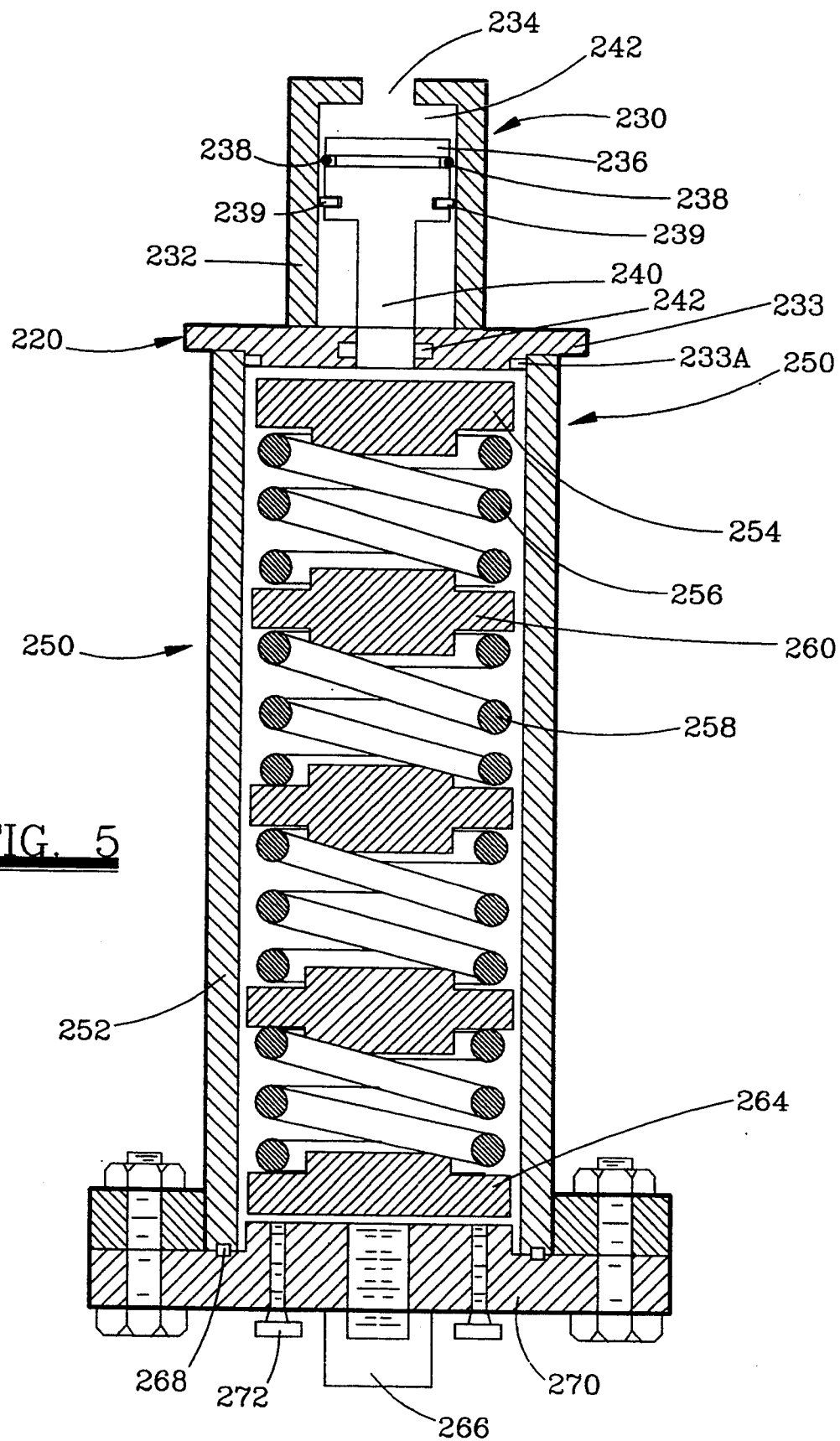
FIG. 5 illustrates a cut away view of one embodiment of the reference element of the present invention.

FIG. 5 illustrates a cut away view of one embodiment of the reference element 220. The reference element 220 has the fluid chamber 230 and the spring chamber 250 as its primary components. The fluid chamber 230 has a housing 232 which is engaged with a casing 252 of the spring chamber 250. The housing 232 has an orifice 234 which is operationally engaged with the line 219 (See, FIG. 4). The housing 232 has there in a piston 236. The piston 236 has a seal 238 and a guide ring 239. Engaged with the piston 236 is a rod 240. The fluid chamber 230 of the reference element 220 has a lower endcap 233 in operative association with an o-ring 233A for sealing the endcap 233. The fluid chamber 230 has an upper endcap 237 in operative association with an o-ring 237A for sealing the endcap. The rod 240 is movably engaged with a bearing 242. As the piston 236 moves in the housing 232, a fluid chamber 235 is created. Thus, as the fluid ingresses through the orifice 234, the size of the fluid chamber 235 is increased as the piston 236 pushes the rod 240. The spring chamber 250 is provided with an adjustment plug 266 for precise setting of pre-load on the springs, thereby controlling the threshold at which the system detects a transient.

In this illustrated embodiment, the spring chamber 250 has a casing 252 which contains a contact piston 254, an intermediate piston 260 and a lower guide piston 264. Between the respective pistons 254, 260 and 264 are the nested springs 256 and 258. It can be appreciated that the number of intermediate pistons 260 and the respective springs 256 and 258 can be increased in number as needed. The pistons 254, 260 and 264 have associated therewith, on the sides engaging the springs 256 and 258, a projection 261.

Figure 6:
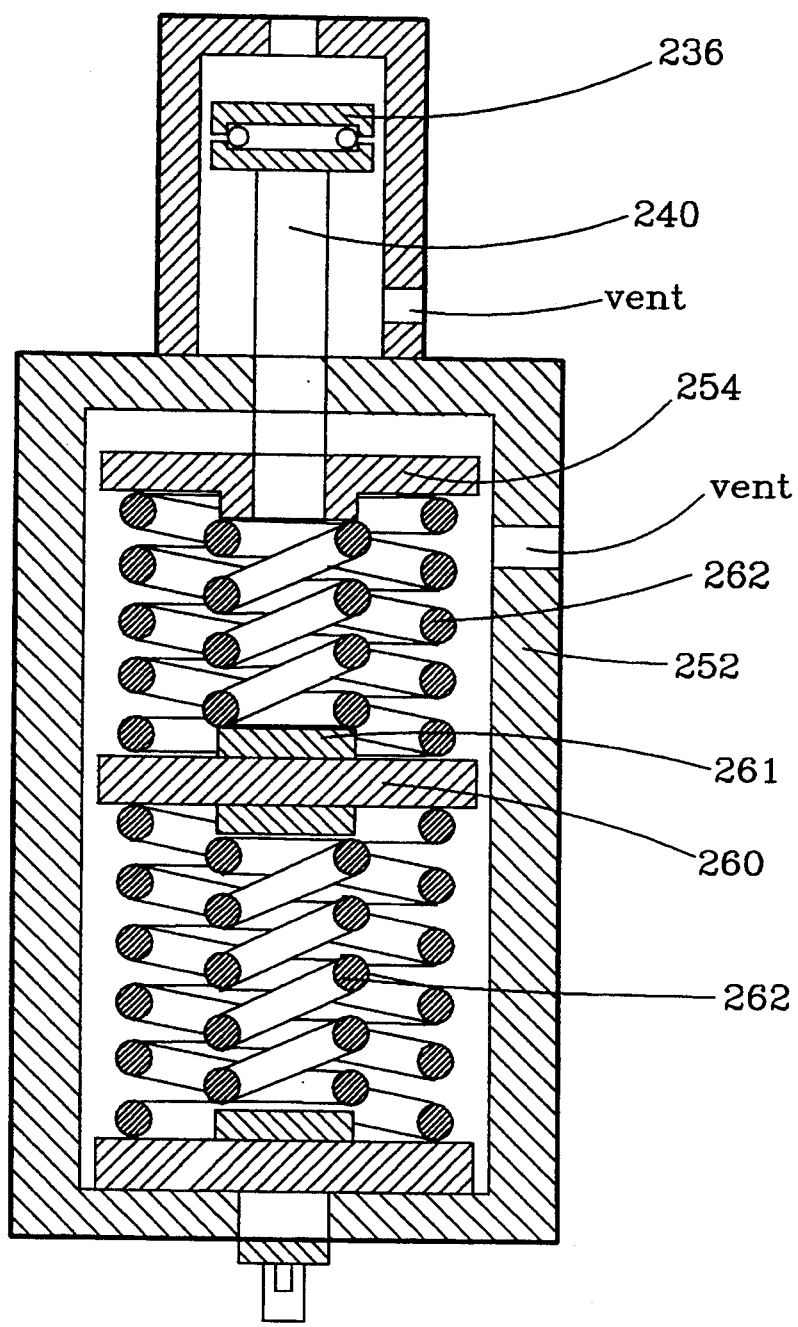
FIG. 6 illustrates a cut away view of another preferred embodiment of the reference element of the present invention.

FIG. 6 illustrates one embodiment of the reference element 250. The spring chamber 250 includes additional pistons 260, the springs 262 and the projections 261 associated with the pistons 260. The springs 262 are actively engaged with the pistons 260 such that the end of the spring is engaged with the flat surface. Also illustrated in FIG. 6 is a seal 268 for removably securing the casing 252 to a cap flange 270. The cap flange 270 has a drain plug 272 and an adjustment plug assembly 266. The spring housing may also contain a fluid.

In another embodiment, the springs 262 have a flattened end 262A. The flattened end 262A of the springs 262 engage the contact piston 254, the intermediate pistons 260 and the lower guide piston 264. The method of securing the flat portion of the springs to the pistons provides for reducing hysteresis.

Figure 7:
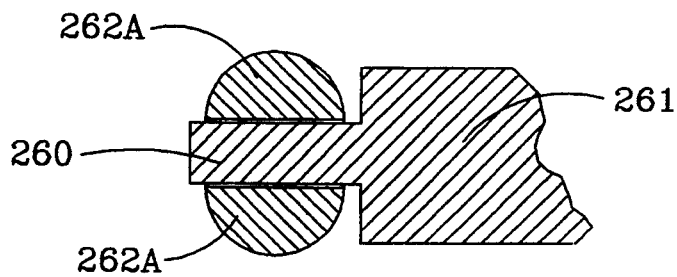
FIG. 7 is a cross sectional, exploded view of the spring biased reference chamber piston of the present invention illustrating the end of the spring as it engages the pistons adjacent to the projection.

FIG. 7 is a cross sectional, exploded view of the end 262A of the spring 262 as it engages the pistons 260 adjacent to the projection 261. The movement of the flattened spring surfaces contacting the pistons 260 may be controlled by appropriate surface finish of the piston 260 or other means of securing such as welding, clamping or pinning, thereby reducing friction and subsequently a reduction in hysteresis.

Figure 8:
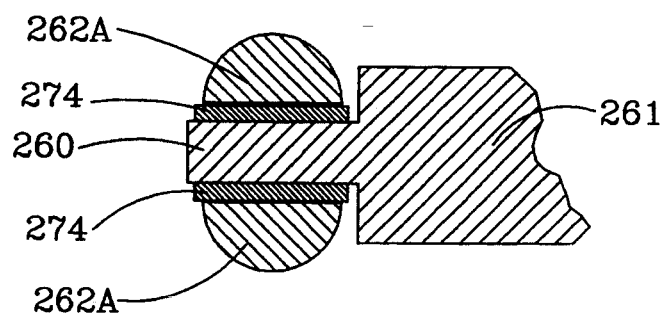
FIG. 8 illustrates yet another embodiment of the spring biased reference chamber piston of the present invention.

FIG. 8 is yet another embodiment of the end of the spring 262. The end 262A of each spring 262 is engaged with a shim 274 rather than the piston 260. The shim 274 abuts between the piston 260 and the projection 261 such that the opposite ends 262A of each spring 262 compresses the shims 274 against the piston 260. Again, the shims may be used to control friction.

Figure 9:
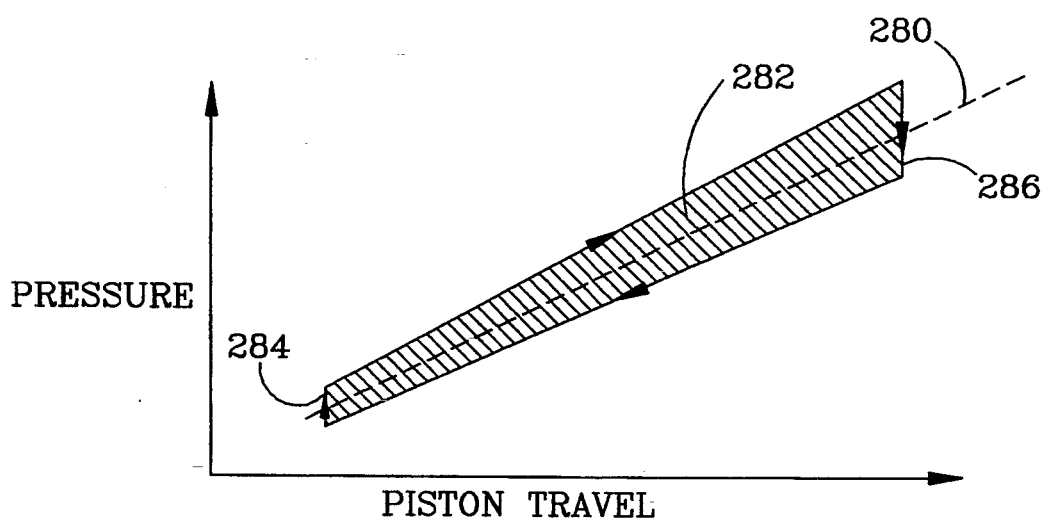
FIG. 9 is a graph illustrating the phenomena of hysteresis, or the time lag exhibited by the piston (displacer) as it moves against the spring in reaction to the fluid pressure applied to the piston.

FIG. 9 is a graph illustrating the phenomena of hysteresis. The objective of eliminating hysteresis is to create as small an area as possible in the enclosed surface or area 282 which has been cross-hatched for clarity. It is an object of the present invention for the compression and expansion of the springs 262 in the spring chamber 250 to create as nearly as practical a continuous, linear straight line 280 in FIG. 9. Thus, if completely accurate, a single straight line as illustrated in FIG. 9 by a dash line 280 would represent no hysteresis. The configuration of the reference element 220 illustrated in FIGS. 5–8 provides for a small area 282. Maintaining a small hysteresis is critical to accurately measuring flow.

Figures 10, 11:
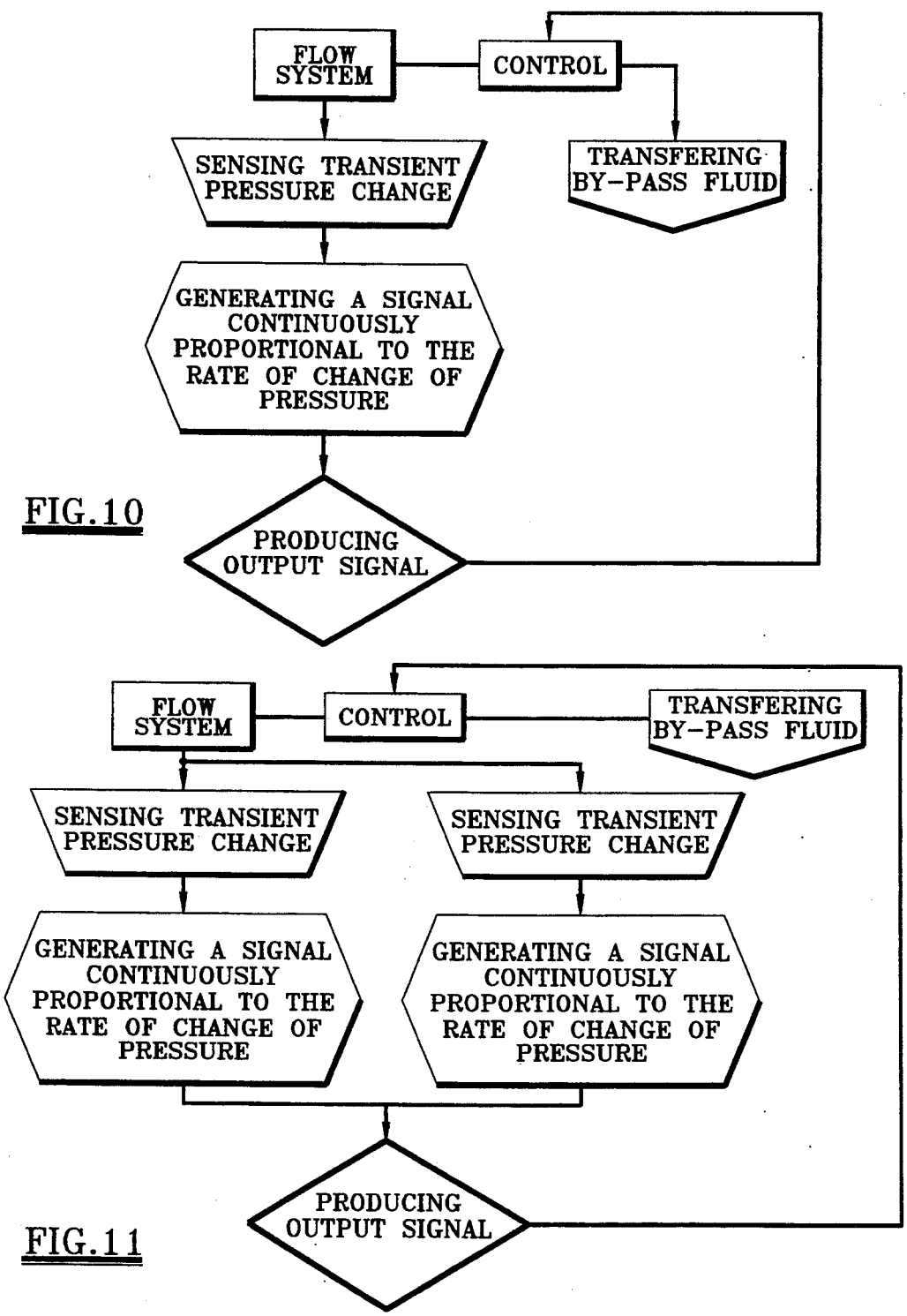
FIG. 10 is a flow diagram illustrating a preferred method of the present invention.
FIG. 11 is a flow diagram illustrating another preferred method of the present invention.

FIG. 10 is a flow diagram illustrating a preferred method using the present invention. The surge relief method of the present invention senses, tracks and responds to pressure changes in the flow system. The surge relief method of the present invention comprises sensing a transient pressure change from the flow system. The pressure change sensed from the flow system is used for generating a signal which is continuously proportional to the rate of change of the pressure as sensed from the flow system. The signal is used for producing an output. The output is used, in association with a control, for transferring by-pass fluid from the system when the rate of change of pressure exceeds a specific amount.

FIG. 11 is a flow diagram illustrating another preferred method of the present invention. FIG. 11 illustrates the use of the present invention to sense the pressure change associated with the flow system and to sense the absolute pressure associated with the flow system. The method of FIG. 11 incorporate sensing transient pressure change and sensing absolute pressure change. The sensing of the transient pressure change provides for generating a signal continuously proportional to the rate of change of the pressure. The sensing of the absolute pressure provides for comparing the absolute pressure to some predetermined pressure which is a characteristic of the flow system. The signals associated with the sensing steps provide for producing an output signal. The output signal in conjunction with controls associated with the flow system, provide for transferring by-pass fluid from the flow system whenever the rate of change of pressure is too great or whenever the absolute pressure exceeds a predetermined pressure thereby preventing damage caused by the pressure changes in the flow system.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A surge relief apparatus for sensing, tracking and responding to pressure changes in a flow system to prevent damage caused by transient pressure changes in the flow system having one or more conduits with fluid, the surge relief apparatus comprising:
   (a) a flow element in an upstream conduit,
   (b) a reference element in operative association with said flow element for generating a first signal proportional to the change in pressure, said reference element further comprises a linearizing element comprising:
      (1) a fluid member comprising:
         (A) a housing in communication with said flow element,
         (B) a piston in operative association with said housing for dividing said housing into a hydraulic chamber and a mechanical chamber, and
         (C) a rod movably associated with said piston in the mechanical chamber of said housing such that fluid entering the hydraulic chamber of said housing displaces said piston and said rod such that the amount of displacement has a linear relationship to the fluid pressure in the hydraulic chamber, (2) a chamber where said fluid member receives the transient pressure changes and transfers mechanical force to a resilient member which provides the linear response, which resilient member comprises:

(A) a housing in communication with said fluid member having means for receiving the mechanical force from said fluid member, and (B) one or more springs for reacting to the mechanical force from said fluid member, (c) a pressure sensor in communication with an upstream conduit and responsive only to the fluid in the flow system for sensing pressure level changes in the flow system and for generating a second signal continuously proportional to the pressure level in the flow system, (d) a regulator responsive only to the first and second signals for producing an output when either the rate of the transient pressure change is greater than a predetermined value or the pressure in the system exceeds a preestablished value, and (e) a valve for receiving the output from said regulator for transferring by-pass fluid from the flow system for relieving the surge of pressure indicated by the rate of the transient pressure change or the pressure level in the system.

2. A surge relief apparatus as defined in claim 1 further comprising means for testing and calibrating the surge relief apparatus.

* * * * *